(12) United States Patent
Mani et al.

(10) Patent No.: US 10,250,740 B2
(45) Date of Patent: *Apr. 2, 2019

(54) ECHO PATH CHANGE DETECTOR (71) Applicant: Imagination Technologies Limited, Kings Langley (GB)

(72) Inventors: Senthil Kumar Mani, Hyderabad (IN); Sowmya Mannava, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/479,627

(22) Filed: Apr. 5, 2017

(65) Prior Publication Data
US 2017/0208170 A1 Jul. 20, 2017

Related U.S. Application Data

(63) Continuation of application No. 14/578,992, filed on Dec. 22, 2014, now Pat. No. 9,648,158.

(30) Foreign Application Priority Data

Dec. 23, 2013 (GB) .................................. 1322925.7

(51) Int. Cl.
*H04M 3/00* (2006.01)
*H04M 9/08* (2006.01)

(52) U.S. Cl.
CPC ........... *H04M 3/002* (2013.01); *H04M 9/082* (2013.01)

(58) Field of Classification Search
CPC .............................. H04M 3/002; H04M 9/082
See application file for complete search history.

(56) References Cited

U.S. PATENT DOCUMENTS

| | | | |
|---|---|---|---|
| 5,987,143 A * | 11/1999 | Okuno | H04M 9/082 379/406.13 |
| 6,035,034 A | 3/2000 | Trump | |
| 6,125,179 A | 9/2000 | Wu | |
| 6,226,380 B1 | 5/2001 | Ding | |

(Continued)

FOREIGN PATENT DOCUMENTS

EP 0884886 A2 12/1998

OTHER PUBLICATIONS

Haykin, S., "Adaptive Filter Theory", 3rd ed., Prentice-Hall, Englewood Cliffs, NJ, 1996.

(Continued)

*Primary Examiner* — Lisa Hashem
(74) *Attorney, Agent, or Firm* — Vorys, Sater, Seymour and Pease LLP; Vincent M DeLuca (57) ABSTRACT

An echo path monitoring system for controlling an adaptive filter configured to estimate an echo of a far-end signal comprised in a microphone signal, the system comprising a comparison generator configured to compare the microphone signal with the estimated echo to obtain a first comparison and compare an error signal, which represents a difference between the microphone signal and the estimated echo, with the estimated echo to obtain a second comparison, and a controller configured to combine the first and second comparisons to form a parameter indicative of a state of the microphone signal and, in dependence on said parameter, control an operating mode of the adaptive filter.

20 Claims, 9 Drawing Sheets

(56) References Cited

U.S. PATENT DOCUMENTS

| | | | |
|---|---|---|---|
| 6,687,723 B1 | 2/2004 | Ding | |
| 6,775,653 B1* | 8/2004 | Wei | H04B 3/23 |
| | | | 379/406.01 |
| 7,809,129 B2* | 10/2010 | Wu | H04M 9/082 |
| | | | 370/201 |
| 7,881,459 B2* | 2/2011 | Wu | H04M 9/082 |
| | | | 370/290 |
| 8,953,777 B1 | 2/2015 | Chhetri | |
| 9,326,055 B2* | 4/2016 | Schneider | H04S 7/301 |
| 2003/0118178 A1* | 6/2003 | Tahernezhaadi | H04M 9/082 |
| | | | 379/406.01 |
| 2004/0161101 A1* | 8/2004 | Yiu | H04M 9/082 |
| | | | 379/406.01 |
| 2005/0129223 A1* | 6/2005 | Piket | H04M 9/082 |
| | | | 379/406.01 |
| 2008/0101622 A1 | 5/2008 | Sugiyama | |
| 2009/0074177 A1* | 3/2009 | Takada | H04M 9/082 |
| | | | 379/406.01 |
| 2009/0089054 A1* | 4/2009 | Wang | H04M 9/082 |
| | | | 704/233 |
| 2009/0232297 A1* | 9/2009 | Takada | H04M 9/082 |
| | | | 379/406.08 |
| 2009/0245527 A1* | 10/2009 | Kumar | H04B 3/234 |
| | | | 381/66 |
| 2010/0057454 A1* | 3/2010 | Mohammad | H04B 3/234 |
| | | | 704/233 |
| 2010/0086122 A1* | 4/2010 | Takada | H04M 9/082 |
| | | | 379/406.08 |
| 2011/0019833 A1* | 1/2011 | Kuech | H04M 9/082 |
| | | | 381/66 |
| 2012/0063609 A1* | 3/2012 | Triki | H04M 9/082 |
| | | | 381/66 |
| 2012/0087509 A1* | 4/2012 | Elmedyb | H04R 3/02 |
| | | | 381/71.11 |
| 2012/0250872 A1* | 10/2012 | LeBlanc | H04M 9/082 |
| | | | 381/71.1 |
| 2012/0287769 A1* | 11/2012 | Saleem | H04M 9/082 |
| | | | 370/201 |
| 2013/0044872 A1* | 2/2013 | Eriksson | H04B 3/23 |
| | | | 379/406.08 |
| 2013/0308771 A1* | 11/2013 | Raifel | H04B 3/23 |
| | | | 379/406.01 |
| 2014/0329568 A1* | 11/2014 | Xue | G10K 11/16 |
| | | | 455/570 |
| 2015/0011266 A1* | 1/2015 | Feldt | H04M 9/082 |
| | | | 455/570 |
| 2015/0078566 A1* | 3/2015 | Kumar | G10L 21/0208 |
| | | | 381/66 |
| 2015/0078567 A1* | 3/2015 | Mani | G10K 11/175 |
| | | | 381/66 |
| 2015/0181018 A1* | 6/2015 | Mani | H04M 3/002 |
| | | | 379/406.08 |
| 2016/0006880 A1* | 1/2016 | Lu | H04M 9/082 |
| | | | 379/406.08 |
| 2016/0127535 A1* | 5/2016 | Theverapperuma | H04M 3/002 |
| | | | 455/570 |
| 2017/0118326 A1* | 4/2017 | Mani | H04M 3/002 |
| 2018/0077290 A1* | 3/2018 | Zargar | H04M 9/082 |

OTHER PUBLICATIONS

Mani et al., "Projection Based Near-end Speech Detectors for Time Domain Adaptive Echo Cancellation", International Journal of Recent Trends in Engineering, May 2009, vol. 1, No. 3.

Benesty et al. "A new class of doubletalk detectors based on cross-correlation", IEEE Trans. Speech Audio Process., vol. 8, No. 2, pp. 168-172, 2000.

Mani, "Variable Step Size (VSS) control for Circular Leaky Normalized Least Mean Square (CLNLMS) algorithm used in AEC". TENCON 2008 IEEE Region 10 Conference. Nov. 19-21, 2008, pp. 1-6.

Valin, "On Adjusting the Learning Rate in Frequency Domain Echo Cancellation With Double-Talk" Audio, Speech, and Language Processing, Mar. 2007, pp. 1030-1034.

Iqbal, "A Novel Normalized Cross-Correlation Based Echo-Path Change Detector", Region 5 Technical Conference, 2007 IEEE, Apr. 20-22, 2007, pp. 249-251.

Ohta et al, "Acoustic Echo Cancellation using Sub-Adaptive Filter" Acoustics, Speech and Signal Processing, 2007. ICASSP 2007. Apr. 15-20, 2007, pp. 1-85-1-88.

Jung et al., "A new double-talk detector using echo path estimation", Acoustics, Speech, and Signal Processing (ICASSP), 2002 IEEE Intl Conference, May 2002; pp. 1897-1900.

NPL Docs in Parent Apn.

\* cited by examiner

ECHO PATH CHANGE DETECTOR

BACKGROUND

Figure 1A:
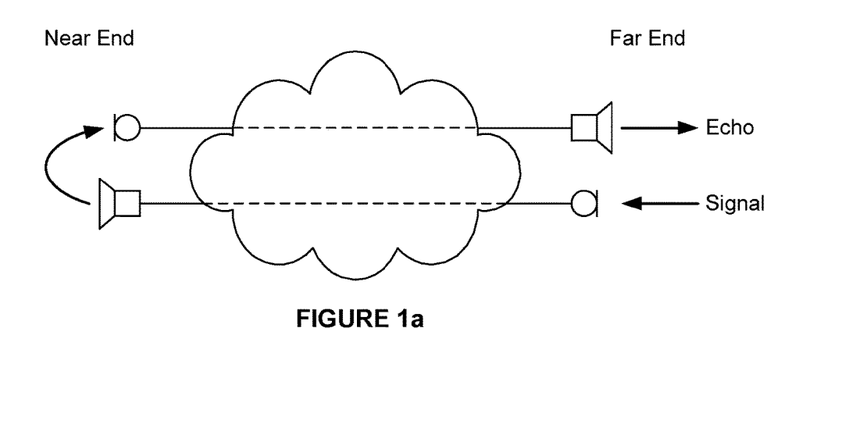
FIG. 1a shows an example of near-end and far-end in telephony.

In telephony, an echo is a reflection of the voice signal. It is a delayed copy of the original. An example scenario is illustrated in FIG. 1a, which shows a signal being captured by a far-end microphone and output by a near-end loudspeaker. The echo is a consequence of acoustic coupling between the near-end loudspeaker and a near-end microphone; the near-end microphone captures the signal originating from its own loudspeaker in addition to the voice of the near-end speaker and any background noise. The result is an echo at the far-end loudspeaker. Echo cancellation is an important feature of telephony. Hands-free devices and teleconferencing, in particular, require echo cancellation that can adapt to environments having a wide range of acoustic characteristics.

Echo cancellers typically synthesise an estimate of the echo from the far-end voice signal. The estimated echo is then subtracted from the near-end microphone signal. This technique requires adaptive signal processing to generate a signal accurate enough to cancel the echo effectively. An adaptive filter is often used to model the environment's acoustic impulse response. Adaptation of this filter is usually frozen during near-end speech because otherwise the filter tries to adapt to the near-end speech, which causes its coefficients to diverge. Near-end speech (or double-talk) detectors are generally not sensitive to echo path changes, however. Consequently the adaptive filter may be frozen just when it needs to adapt at a faster rate.

There is a need for a practical system that is sensitive to changes in the microphone signal, so that an adaptive filter can be appropriately controlled.

SUMMARY OF THE INVENTION

According to one embodiment of the present invention, there is provided an echo path monitoring system for controlling an adaptive filter configured to estimate an echo of a far-end signal comprised in a microphone signal, the system comprising a comparison generator configured to compare the microphone signal with the estimated echo to obtain a first comparison and compare an error signal, which represents a difference between the microphone signal and the estimated echo, with the estimated echo to obtain a second comparison and a controller configured to combine the first and second comparisons to form a parameter indicative of a state of the microphone signal and, in dependence on said parameter, control an operating mode of the adaptive filter.

The parameter may be indicative of the presence of near-end speech and/or echo path change in the microphone signal.

The controller may be configured to, if the parameter indicates that neither near-end speech nor echo path change is present, control the adaptive filter to operate in a first mode. The controller may be configured to control the adaptive filter to operate in the first mode by continuously adapting its estimation of the echo of the far-end signal.

The controller may be configured to, if the parameter indicates that near-end speech is present but echo path change is not present, control the adaptive filter to operate in a second mode. The controller may be configured to control the adaptive filter to operate in the second mode by suspending adaptation of its estimation of the echo of the far-end signal.

The controller may be configured to, if the parameter indicates that echo path change is present, control the adaptive filter to act in a third mode. The controller may be configured to, when the adaptive filter is operating in the third mode, control a step size of an adaptation performed by the adaptive filter. The controller may be configured to control the adaptive filter to operate in the third mode by re-initialising its adaptation such that the adaptation step size is set to its maximum value and other convergence-related parameters are reset.

The controller may be configured to assign a state to the microphone signal in dependence on an operating state of the adaptive filter.

The controller may be configured to assign the microphone signal state in dependence on whether the adaptive filter is in a transient state or a steady state.

The controller may be configured to: when the adaptive filter is in the steady state, assess whether the microphone signal incorporates echo path change; and when the adaptive filter is in the transient state, not assess whether the microphone signal incorporates echo path change.

The controller may be configured to, when the adaptive filter is in the steady state, determine that the parameter indicates that neither near-end speech nor echo path change is present if the parameter is below a first predetermined threshold.

The controller may be configured to, when the adaptive filter is in the steady state, determine that the parameter indicates that double-talk is present but echo path change is not present if it is between the first predetermined threshold and a second predetermined threshold.

The controller may be configured to, when the adaptive filter is in the steady state, determine that the parameter indicates echo path change is present if it is above the second predetermined threshold.

The controller may be configured to, when the adaptive filter is in the transient state, compare the parameter with a third predetermined threshold and control the adaptive filter to operate in the first mode if the parameter is below the third threshold and in the second mode if the parameter is above the third threshold.

The controller may be configured to form the parameter by dividing the second comparison by the sum of the first and second comparisons.

The comparison generator may be configured to generate the first comparison by estimating a cross-correlation of the microphone signal and the estimated echo and to generate the second comparison by estimating a cross-correlation between the error signal and the estimated echo.

According to a second embodiment of the invention, there is provided machine readable code for generating an echo path monitoring system.

According to a third embodiment of the invention, there is provided a machine readable storage medium having encoded thereon non-transitory machine-readable code for generating an echo path monitoring system.

According to a fourth embodiment of the invention, there is provided a method for controlling an adaptive filter that is configured to estimate an echo of a far-end signal comprised in a microphone signal, the method comprising comparing the microphone signal with the estimated echo to obtain a first comparison, comparing an error signal, which represents a difference between the microphone signal and the estimated echo, with the estimated echo to obtain a second comparison, combining the first and second comparisons to form a parameter indicative of a state of the microphone signal and, in dependence on said parameter, controlling an operating mode of the adaptive filter.

The parameter may be indicative of the presence of near-end speech and/or echo path change in the microphone signal.

The method may comprise, if the parameter indicates that neither near-end speech nor echo path change is present, controlling the adaptive filter to operate in a first mode.

The method may comprise controlling the adaptive filter to operate in the first mode by continuously adapting its estimation of the echo of the far-end signal.

The method may comprise, if the parameter indicates that near-end speech is present but echo path change is not present, controlling the adaptive filter to operate in a second mode.

The method may comprise controlling the adaptive filter to operate in the second mode by suspending adaptation of its estimation of the echo of the far-end signal.

The method may comprise, if the parameter indicates that echo path change is present, controlling the adaptive filter to act in a third mode.

The method may comprise, when the adaptive filter is operating in the third mode, controlling a step size of an adaptation performed by the adaptive filter.

The method may comprise controlling the adaptive filter to operate in the third mode by re-initialising its adaptation such that the adaptation step size is set to its maximum value.

The method may comprise assigning a state to the microphone signal in dependence an operating state of the adaptive filter.

The method may comprise assigning the microphone signal state in dependence on whether the adaptive filter is in a transient state or a steady state.

The method may comprise: when the adaptive filter is in the steady state, assessing whether the microphone signal incorporates echo path change; and when the adaptive filter is in the transient state, not assessing whether the microphone signal incorporates echo path change.

The method may comprise, when the adaptive filter is in the steady state, determining that the parameter indicates that neither near-end speech nor echo path change is present if the parameter is below a first predetermined threshold.

The method may comprise, when the adaptive filter is in the steady state, determining that the parameter indicates that double-talk is present but echo path change is not present if it is between the first predetermined threshold and a second predetermined threshold.

The method may comprise, when the adaptive filter is in the steady state, determining that the parameter indicates echo path change is present if it is above the second predetermined threshold.

The method may comprise, when the adaptive filter is in the transient state, compare the parameter with a third predetermined threshold and controlling the adaptive filter to operate in the first mode if the parameter is below the third threshold and in the second mode if the parameter is above the third threshold.

The method may comprise forming the parameter by dividing the second comparison by the sum of the first and second comparisons.

The method may comprise generating the first comparison by estimating a cross-correlation of the microphone signal and the estimated echo and generating the second comparison by estimating a cross-correlation between the error signal and the estimated echo.

According to a fifth embodiment of the invention, there is provided machine readable code for implementing a method for controlling an adaptive filter.

According to a sixth embodiment of the invention, there is provided a machine readable storage medium having encoded thereon non-transitory machine-readable code implementing a method for controlling an adaptive filter.

BRIEF DESCRIPTION OF THE DRAWINGS

The present invention will now be described by way of example with reference to the accompanying drawings. In the drawings.

DETAILED DESCRIPTION

An echo path monitoring system may be configured to generate a parameter that is indicative of the state of a microphone signal. The echo path monitoring system may also be configured to control an adaptive filter for cancelling echo in a telephony system. The echo path monitoring system may control the adaptive filter in dependence on the parameter so that the operating mode of the filter is set in dependence on contents of the microphone signal, in particular whether it contains only far-end speech or near-end speech or double talk, or only silence or ambient noise at the near-end, and/or echo path change.

Figure 1B:
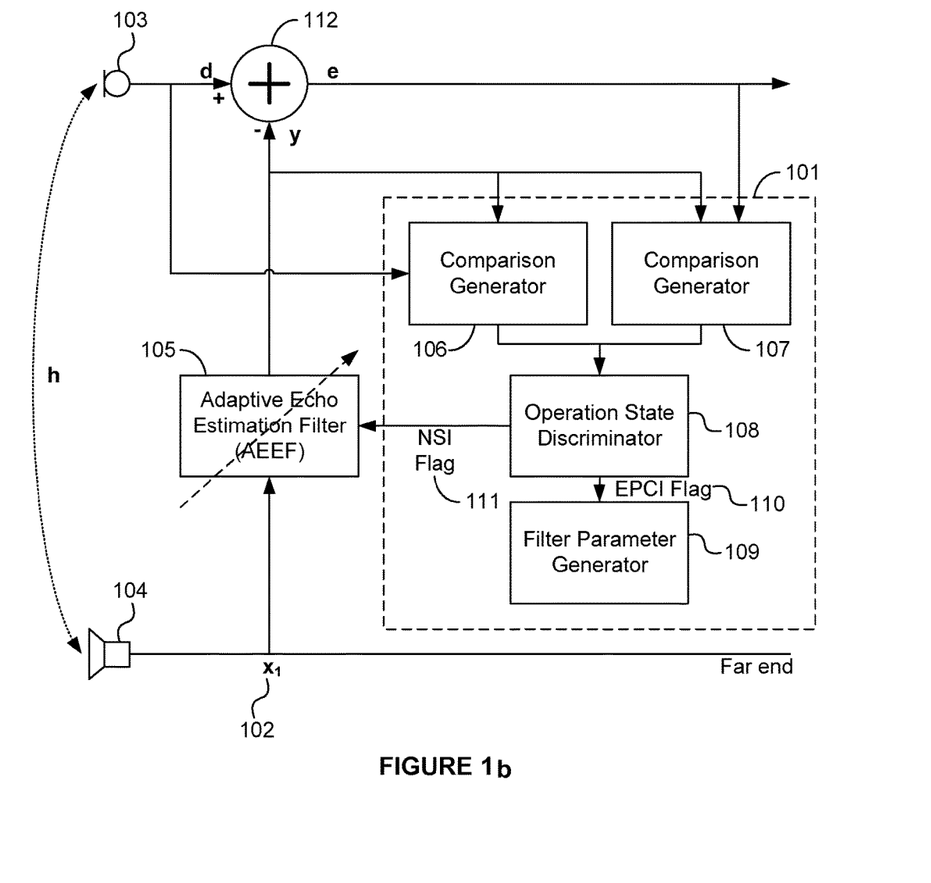
FIG. 1b shows an architecture of an exemplary echo path monitoring system.

FIG. 1b shows an example of an echo path monitoring system generally at 101 (represented by the dotted line). The system is configured to receive a microphone signal d, an estimated echo signal ŷ, and an error signal e, which represents the difference between the microphone signal and the estimated echo and is output by subtractor 112. Microphone 103 captures a signal that includes an echo of a signal output by loudspeaker 104. The echo is a delayed version of far-end signal x filtered by the acoustic environment, represented by h. The system comprises two comparison generators 106, 107. The first comparison generator 106 compares the microphone signal d with the estimated echo ŷ. The second comparison generator 107 compares the error signal e with the estimated echo ŷ.

The comparisons generated by the two comparison generators are passed to operation state discriminator 108, which is configured to control adaptive filter 105. The operation state discriminator preferably combines the comparisons generated by the first and second comparison generators to form a parameter that is indicative of the state of the microphone signal, and particularly whether near-end speech or echo path change is present or not. The operation state discriminator in this example is configured to output two flags 110, 111 to control the operation of the adaptive filter. The first of these flags 110 is raised to indicate the presence of echo path change, which causes the filter parameter generator 109 to reset the critical convergence parameters for the adaptive filter. The second flag 111 is raised to indicate that adaptation of the filter should be frozen. Normally this is because the parameter indicates the presence of near-end speech, but it could also be because far-end speech has stopped so that the far-end signal comprises only silence or ambient background noise.

The operation state discriminator may further comprise a steady-state state discriminator and a transient-state state discriminator (not shown) for controlling the operation of the adaptive filter in dependence on its current operating state (described in more detail below).

The role of the adaptive filter is to identify the acoustic echo path between a communication terminal's loudspeaker and its microphone. This is predominantly the acoustic impulse response of the room, but it may also incorporate elements relating to the hardware and related software in the audio driver interface and other devices in the audio path. The adaptive filter uses the estimated impulse response to generate an estimate of the echo signal, which can then be removed from the audio signal captured by the microphone. The adaptive filter is preferably a Variable Step Size (VSS) filter. The choice of step size reflects a trade-off between fast convergence and good tracking ability on the one hand and good steady state cancellation on the other.

The echo path monitoring system in FIG. 1b is shown as comprising a number of functional blocks. This is for illustrative purposes only. It is not intended to define a strict division between different parts of hardware on a chip or between different programs, procedures or functions in software. In some embodiments, some or all of the algorithms described herein may be performed wholly or partly in hardware. In most practical implementations, the echo path monitoring system will be implemented by a processor acting under software control.

The comparison generators may use any appropriate mathematical operation to compare the respective signals. Suitable examples may include cross-correlation and covariance calculations. The resulting comparisons suitably provide the operation state discriminator with a measure of how similar the respective signals are to each other.

Adaptation is generally frozen during the presence of near-end speech. Conventionally a Double-talk Detector (DTD) (sometimes referred to as a Near-end Signal Detector (NSD)) is used as an indicator for freezing the filter. The DTD detects the presence of a near-end speech signal in the microphone signal. The most popular DTDs are projection based, as they are technically simple, easy to implement and perform reasonably well in most use scenarios. Such DTDs are at risk of misclassifying echo path change as the presence of a near-end signal, causing adaptation to be frozen. In the case of an adaptive filter with VSS-based control, the adaptive step size can become zero or very low as the filter is continuously adapted. The risk is that the step size may be zero when echo path change occurs and then the filter adaptation is frozen just when it is required the most. The consequence can be echo and near-end speech distortion for the remainder of the call.

In one example, the microphone signal may be assigned one of three different states:
  STATE 1: Far-end talk alone
  STATE 2: Near-end speech, either alone or in combination with far-end speech, or ambient background noise or silence
  STATE 3: Echo path change in STATE 1 or STATE 2

In many situations where the near-end signal contains significant signal energy that is independent of any echo this will be due to talking at the near-end. This situation is conveniently denoted "near-end speech" herein. The signal energy might, of course, be due to a different sound source. This is particularly true during teleconferencing or hands-free operation. Therefore, the term "near-end speech" is used to refer to any significant signal energy in the near-end signal that is not due to an echo. It should also be understood that the term "near-end speech" is largely synonymous with the term "double-talk".

The adaptive filter is well-suited to slow-varying echo path change that occurs from time-to-time. Its usual speed of modeling/tracking echo path change may not be fast enough to track sudden echo path change, however. Detecting echo path change quickly and accurately allows the filter to be placed in an operational mode that is better able to adapt quickly to the new echo path than its conventional mode of continuous adaptation. This ability to adapt to sudden changes in the echo path is becoming increasingly important. Sudden changes tend to be more common in VoIP (Voice over Internet Protocol) systems than in traditional telephony. This is because many of these systems are implemented by applications running at user level, which face being prioritized next to threads for other user applications, real time processing of data etc. Consequently these systems can tend to see frequent, sudden pure delay changes. Other scenarios that may result in sudden echo path change are when either the microphone or the speaker are muted during a conference call, when calls are conducted during high speed travel or when the relative position of a speaker and a microphone changes during hands free operation.

The echo path change detector may control the adaptive filter to operate in a mode that is appropriate to the state of the microphone signal. Suitably this involves controlling the filter's adaptation. For example, during STATE1, the filter may be adapted continuously; during STATE2, filter adaptation may be frozen to avoid filter divergence; and during STATE3, critical filter convergence parameters may be re-initialized. This may involve re-initializing the adaptation step-size to its maximum value and resetting the convergence counter and other implementation related parameters that control the convergence speed of the filter.

The echo path impulse response vector h can be modelled as:

$$h=[h_0 h_1 h_2 \ldots h_{N-1}]^T \quad (1)$$

Where N is the length of the echo path, sampled at same sampling instance as microphone signal d and far-end or reference input signal x.

Let y(n) be the actual acoustic echo, s(n) be the near-end signal and v(n) be the ambient background noise at discrete time instant n. The microphone signal can be written as the sum of the actual echo, the near-end signal and the ambient background noise.

$$d(n)=y(n)+s(n)+v(n) \quad (2)$$

Similar to h, the far-end or reference signal vector x and microphone signal vector d are given by:

$$x=[x(n)x(n-1)x(n-2)\ldots x(n-(N-1))]^T \quad (3)$$

$$d=[d(n)d(n-1)d(n-2)\ldots d(n-(L-1))]^T \quad (4)$$

Where L represents frame length or block length. Its value should not be greater than N.

The actual echo $y(n)$ and the estimated echo $\hat{y}(n)$ output by the adaptive filter are given by the true echo path h and the estimated echo path $\hat{h}$.

$$y(n)=h^T x \quad (5)$$

$$\hat{y}(n)=\hat{h}^T x \quad (6)$$

The error signal $e(n)$ in the acoustic echo cancellation process is given by:

$$e(n)=d(n)-\hat{y}(n) \quad (7)$$

This error signal is often used for adapting the adaptive filter. Commonly this adaptation is achieved using a Normalized Least Mean Square (NLMS) algorithm with a fixed or adaptive step size $\mu$:

$$\hat{h}(n+1) = \hat{h}(n) + 2\mu \frac{e(n)x(n)}{\|x\|^2} \quad (8)$$

The echo path change detector may operate on every sample in the time domain or on blocks of samples in the time domain. It may also operate on blocks of samples in the frequency domain or on samples in a combination of the time and frequency domains.

In the case of time domain sample-based processing, the acoustic echo estimate $\hat{y}(n)$ and error signal $e(n)$ for every discrete instant are estimated using corresponding far-end sample $x(n)$ and microphone signal $d(n)$. In the case of block-processing, the adaptive filter will operate on every block of the far-end signal. To generalize the implementation to be either sample-based or block-based, vector representations are used for the echo estimate $\hat{y}$, error e and microphone signal d.

Since x represents the far-end data used by the adaptive filter, vector $x_1$ can be used to represent current block of far-end signal to be processed. Hence all the new vectors can be given as:

$$x_1=[x(n)x(n-1)x(n-2)\ldots x(n-(L-1))]^T \quad (9)$$

$$d=[d(n)d(n-1)d(n-2)\ldots d(n-(L-1))]^T \quad (10)$$

$$e=[e(n)e(n-1)e(n-2)\ldots e(n-(L-1))]^T \quad (11)$$

In sample based processing, each sample of $x(n)$ in $x_1$ is fed to the far-end data buffer x and the oldest sample is removed. For block based processing, a chunk of data of length L is fed to the far-end data buffer allocated to x and the oldest samples of length L are removed.

The state discrimination parameter is calculated from the cross-correlation between d and $\hat{y}$ ($r_{d\hat{y}}$), and cross-correlation between e and $\hat{y}$ ($r_{e\hat{y}}$). The cross-correlation between the estimated error and the echo estimate is given as:

$$r_{e\hat{y}}=E[e\hat{y}^T] \quad (12)$$

Since the error vector e is the difference between microphone output d and the echo estimate $\hat{y}$, $r_{e\hat{y}}$ can be given as.

$$r_{e\hat{y}}=E[(d-\hat{y})(\hat{y})^T] \quad (13)$$

After substituting microphone signal as given from (2), $r_{e\hat{y}}$ can be arrived as given below $$r_{e\hat{y}}=E[(y+s+v-\hat{y})^T] \quad (14)$$

Assuming s and v are un-correlated to the echo estimate $\hat{y}$, their cross-correlation is zero. So (14) can be reduced to:

$$r_{e\hat{y}}=E[(y-\hat{y})(\hat{y})^T] \quad (15)$$

From (5) and (6), and by substituting the actual echo and the echo estimate into equation (15):

$$r_{e\hat{y}}=E[(h^T x - \hat{h}^T x)(\hat{h}^T x)^T]$$

$$r_{e\hat{y}}=E[(h^T x - \hat{h}^T x)x^T \hat{h}]$$

$$r_{e\hat{y}}=E[(h^T - \hat{h}^T)xx^T \hat{h}]$$

$$r_{e\hat{y}}=(h^T - \hat{h}^T)E[xx^T]\hat{h} \quad (16)$$

Taking the auto-correlation of the far-end signal to be $R_{xx}$:

$$r_{e\hat{y}}=(h^T - \hat{h}^T)R_{xx}\hat{h} \quad (17)$$

Similarly, the cross-correlation between the microphone signal and the echo estimate is given by:

$$r_{d\hat{y}}=E[d\hat{y}^T] \quad (18)$$

After substituting microphone signal in (18), $r_{d\hat{y}}$ can be arrived at as:

$$r_{d\hat{y}}=E[(y+s+v)(\hat{y})^T] \quad (19)$$

Since s and v are assumed un-correlated to the echo estimate $\hat{y}$, their cross-correlation is zero.

$$r_{d\hat{y}}=E[y\hat{y}^T] \quad (20)$$

Substituting equations (5) and (6) in (20):

$$r_{d\hat{y}}=E[(h^T x)(\hat{h}^T x)^T]$$

$$r_{d\hat{y}}=E[h^T xx^T \hat{h}]$$

$$r_{d\hat{y}}=h^T E[xx^T]\hat{h}$$

$$r_{d\hat{y}}=h^T R_{xx}\hat{h} \quad (21)$$

Based on these cross-correlation values, state discrimination parameter $\zeta_{HS}(n)$ is given by:

$$\zeta_{HS}(n) = \left| \frac{r_{e\hat{y}}(n)}{r_{e\hat{y}}(n) + r_{d\hat{y}}(n)} \right| \quad (22)$$

$$\zeta_{HS}(n) = \left| \frac{\left(h^T - \hat{h}^T\right)R_{xx}\hat{h}}{\left(h^T - \hat{h}^T\right)R_{xx}\hat{h} + h^T R_{xx}\hat{h}} \right| \quad (23)$$

Let $\Delta h = (h^T - \hat{h}^T)$ be the misadjustment parameter. Then (23) can be reduced to:

$$\zeta_{HS}(n) = \left| \frac{\Delta h R_{xx}\hat{h}}{\Delta h R_{xx}\hat{h} + h^T R_{xx}\hat{h}} \right| \quad (24)$$

$\Delta h$ is sensitive to the echo path changes as well as echo path modeling by the adaptive filter due to various reasons (such as delay in near-end speech detection, adaptation during background noise or near-end noise etc.). Equation (24) provides an optimal echo path change indicator for proper control of an adaptive filter.

During STATE 1, the misadjustment value is expected to be near to zero as the estimated impulse response reaches a steady state. This results in the $\zeta_{HS}(n)$ value also being near zero. Hence the NSI Flag and EPCI flag remain set at 0. The $\zeta_{HS}(n)$ value increases slightly during STATE 2 because the misadjustment factor has some value away from zero, but the discrimination parameter doesn't peak due to partial correlation between echo and near-end adding to both the numerator and the denominator. The NSI Flag is set to 1 during STATE 2. The EPCI Flag remains at 0. During STATE 3, the estimated impulse response may deviate greatly from the actual impulse response of the new echo path. This misadjustment (i.e. the difference between the estimated and actual impulse responses) may have high positive or negative values, or may fluctuate between high positive and negative values. The result is a high value of the $\zeta_{HS}(n)$ parameter. The EPCI flag is set to 1 in STATE 3. This flag controls the resetting of the corresponding adaptive filter parameters and allows for quick re-convergence and stable operation of the echo cancellation system.

In order to arrive at the echo path change detection algorithm, it is assumed that the near-end signal and the background noise are un-correlated to the echo estimate. In real-time scenarios partial correlation can exist. This modifies $r_{e\hat{y}}$ to:

$$r_{e\hat{y}} = E[y-\hat{y})(\hat{y})^T] + E[s\hat{y}^T] + E[v\hat{y}^T] \quad (25)$$

From (17), this can be re-written as:

$$r_{e\hat{y}} = (h^T - \hat{h}^T) R_{xx} \hat{h} + E[s\hat{y}^T] + E[v\hat{y}^T] \quad (26)$$

Similarly $r_{d\hat{y}}$ transforms to:

$$r_{d\hat{y}} = E[y\hat{y}^T] + E[s\hat{y}^T] + E[v\hat{y}^T] \quad (27)$$

From (21), (27) can be re-written as:

$$r_{d\hat{y}} = h^T R_{xx} \hat{h}^T + E[s\hat{y}^T] + E[v\hat{y}^T] \quad (28)$$

Substituting estimated correlations $r_{e\hat{y}}$ and $r_{d\hat{y}}$ from (26) and (28), $\zeta_{HS}(n)$ can be given as:

$$\zeta_{HS}(n) = \left| \frac{\Delta h R_{xx} \hat{h} + E[s\hat{y}^T] + E[v\hat{y}^T]}{\Delta h R_{xx} \hat{h} + h^T R_{xx} \hat{h} + E[s\hat{y}^T] + E[v\hat{y}^T]} \right| \quad (29)$$

As both the denominator and the numerator contain $E[s\hat{y}^T] + E[v\hat{y}^T]$, discriminator peaking is controlled during the presence of near-end speech or ambient background noise. Hence, a marginal value of the state discriminator indicates a near-end presence (i.e. STATE 2).

Figure 2:
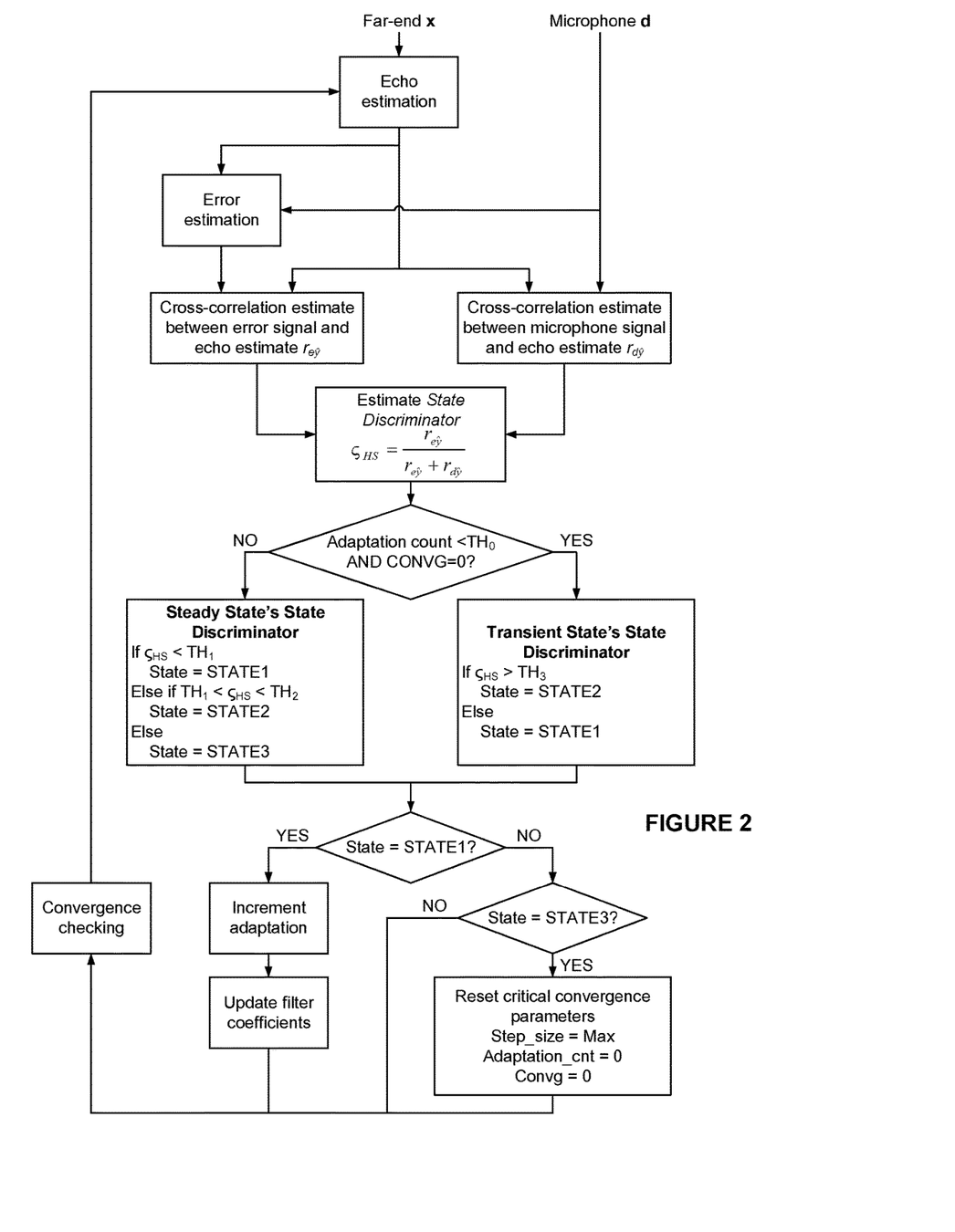
FIG. 2 shows an exemplary process for determining an appropriate adaptive filter operating mode based on the value of a discrimination parameter.

The flow chart given in FIG. 2 depicts how the adaptive filter's operating mode may be determined based on the value of the discrimination parameter. The adaptive filter first estimates the echo using the far-end signal x. The error signal is then generated by subtracting the estimated echo from the microphone signal (as illustrated by subtractor 112 in FIG. 1). The operation state discriminator (shown at 108 in FIG. 1) then estimates the operation state of the filter from the correlations of the echo estimate with the microphone signal and the error signal. These correlations are combined to form the discrimination parameter $\zeta_{HS}(n)$, as described above.

Before determining the operating mode of the filter, the operation state discriminator checks whether the filter is in a transient state or a steady state. It does this by checking the adaptation count for the filter and whether the filter has converged. The adaptation count is a measure of how many times the filter has already undergone an adaptation procedure since it was last initialized. The filter is determined to be in a transient state if the adaptation count is below a threshold and the filter has not converged. Otherwise, the filter is determined to be in a steady state.

In the example shown in FIG. 2, the operation state discriminator controls the operating mode of the filter differently depending on whether the filter is judged to be in a steady state or a transient state. If the filter is judged to be in a transient state, the discrimination parameter is compared with just one threshold (TH$_3$ in the figure) by the transient-state state discriminator. The microphone signal is judged to be in STATE 2 if the discrimination parameter is above the threshold and to be in STATE 1 otherwise. STATE 3 is not assigned in the transient state (in this example) because it is difficult to judge echo path change before the filter coefficients have converged.

In FIG. 2, if the filter is judged to be in a steady state, the discrimination parameter is compared with two different thresholds by the steady-state state discriminator. If the discrimination parameter is below a first threshold, the operating mode of the filter is set to STATE 1. If it is between the first threshold and a second threshold, the operating mode of the filter is set to STATE 2. Finally, if the parameter is above the second threshold the operating mode of the filter is set to STATE 3.

The next step shown in FIG. 2 is to determine whether the microphone signal was judged to be in STATE 1 or not. If it is, the filter is controlled to operate in its first mode of continuous adaptation so the adaptation count is incremented by one and the filter coefficients are updated. If the operating mode is neither STATE 1 nor STATE 3 (i.e. STATE 2), then the filter is controlled to operate in its second mode. Filter adaptation is frozen and no adaptation occurs. If the operating mode is STATE 3, the filter is controlled to operate in its third mode. The filter reinitializes the critical convergence parameters. Its variable step size is set to its maximum value. The adaptation count is set to zero and the convergence parameter is also set to zero (indicating that the filter is now in a transient state). This helps the filter to re-converge quickly. Finally, filter convergence is checked before the process repeats from the beginning.

When the adaptive filter is trying to model the echo path, the discrimination parameter will have a marginal value even during single-talk, i.e. STATE 1. Until filter convergence or certain number of adaptations have been completed, the echo path detector discriminates only between STATE 1 and STATE 2. Thresholds for adaptation count may be arrived at experimentally. Convergence detection may be achieved using an appropriate algorithm. This avoids repetitive resetting of the critical convergence parameters, which may happen during echo path change as the discrimination parameter can have a high peak for some time.

Once the filter reaches convergence, the state discriminator selects between STATE1, STATE2 and STATE3. After convergence is reached, the discrimination parameter is close to zero when the microphone signal is in STATE1. When near-end speech is present, the discrimination parameter does not reach its peak but it does have a value above zero. To discriminate STATE2 from other states, the discrimination parameter has to be between thresholds TH$_1$ and TH$_2$ and the NSI flag is set to one accordingly. The discrimination parameter tends to peak during periods of echo path change. Once the discrimination parameter exceeds a threshold TH2, the state discriminator determines an echo path change has occurred and the EPCI flag is set to one.

Suitable values for the thresholds have been determined from experiments. As an example, the values may be chosen as: TH$_1$=0.1 and TH$_2$=50 for both time and frequency domain processing. The discrimination parameter has been found to usually be below 5 during near-end speech but to exceed 50 during echo path change. Suitable values for $TH_0$ and $TH_3$ might be 4000 and 0.3 respectively.

Figure 3:
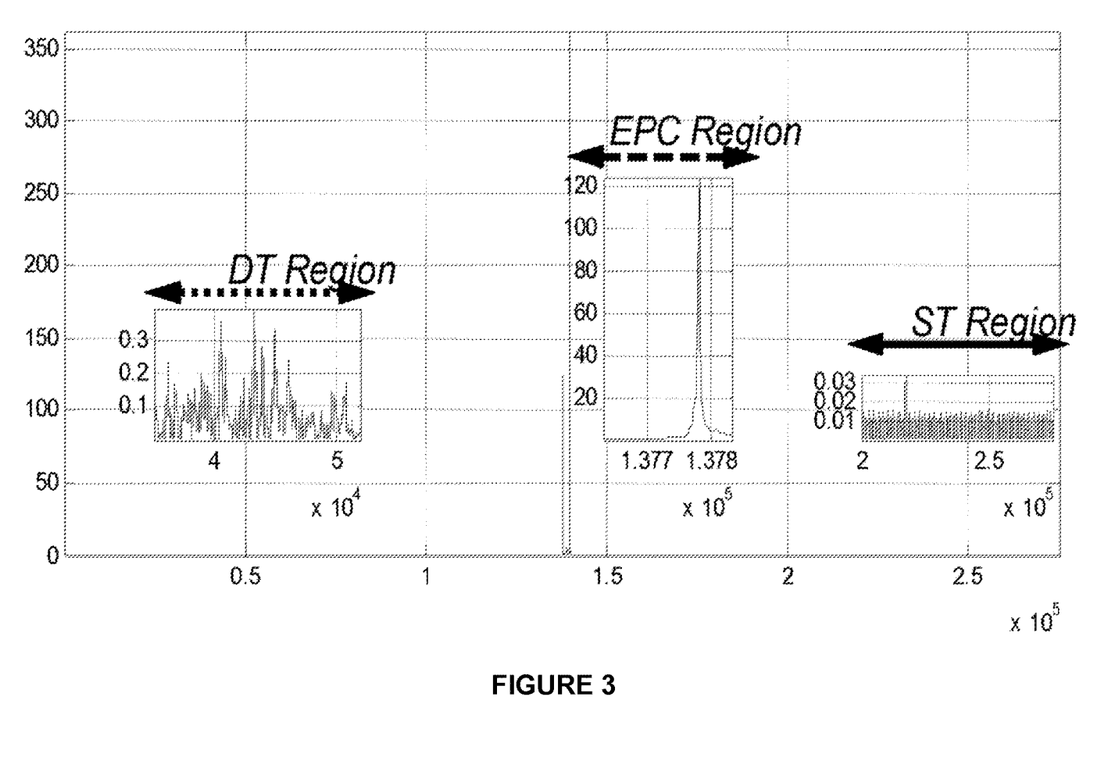
FIG. 3 shows the variation of a discrimination parameter during different states of echo cancellation.

FIG. 3 shows how the discrimination parameter varies when the microphone signal has different states. The test signal is a Composite Source Signal (CSS) signal sampled at 8 KHz. The test signal has a double-talk region from samples 35000 to 52000. An echo path change is introduced at sample 137632. The area zoomed and shown by the dotted line gives the behavior of the parameter during near-end speech, i.e. STATE2. It can be seen that the discrimination parameter is away from zero. Similarly the area in the plot given by the dashed line is the region of echo path change (i.e. STATE3) where the parameter value shoots up. During steady state operation of the filter and STATE 1 of the microphone signal the discrimination parameter is close to zero, as indicated by the solid line.

Some specific implementation details of the proposed technique for time or frequency domain based implementation of the adaptive filter are given below. This is for the purpose of example only and it should be understood that the scope of the invention is not limited to any of the specific implementations described below.

Dot Product Based Implementation a) Discrimination Parameter Estimation Using Sample-by-Sample Processing Three memory buffers e_buf, d_buf and ŷ_buf are used to store the past values of the error signal, microphone signal and the estimated echo respectively. To update the memory buffers and the correlation values, a counter indx1 is used. Initially all buffer locations and counters are set to zero. The counter indx1 is incremented for processing every sample. When the counter value reaches K, it is reset again to zero.

The correlation values are estimated using separate static variables. Every sample's correlation is estimated by adding a correlation of the current sample and removing a corresponding correlation of the oldest sample stored in the buffers.

$$r_{e\hat{y}}(n)=r_{e\hat{y}}(n-1)-e\_buf(indx1)\hat{y}\_buf(indx1)+e(n)\hat{y}(n) \quad (30)$$

$$r_{d\hat{y}}(n)=r_{d\hat{y}}(n-1)-d\_buf(indx1)\hat{y}\_buf(indx1)+d(n)\hat{y}(n) \quad (31)$$

The oldest sample is also removed or replaced by the current sample in the respective buffer.

$$e\_buf(indx1)=e(n) \quad (32)$$

$$\hat{y}\_buf(indx1)=\hat{y}(n) \quad (33)$$

$$d\_buf(indx1)=d(n) \quad (34)$$

After updating the buffers, the counter is incremented by one circularly within K:

indx1=indx1+1 if (indx1>K)

indx1=0 \quad (35)

The value of K is suitably between 200 and 300 for stable operation.

Finally, the discrimination parameter is calculated from the correlations estimated as below.

$$\zeta_{HS}^{num}(n)=|r_{e\hat{y}}(n)|$$

$$\zeta_{HS}^{den}(n)=|r_{e\hat{y}}(n)+r_{d\hat{y}}(n)|$$

$$\zeta_{HS}(n) = \frac{\zeta_{HS}^{num}(n)}{\zeta_{HS}^{den}(n)} \quad (36)$$

Table 1 summarizes the memory required and the operations involved in the implementation of sample based processing.

TABLE 1

Memory required and basic operations involved when K = 300 for sample based processing

| Sampling rate | Memory (Bytes) | Division | Add/Sub/Mult | Others (Comparison/assignment) |
|---|---|---|---|---|
| 8000 | 300 * 3 * 2 = 1800 | 1 | 4 + 2 + 5 | 2 + 8 |
| 16000 | 2 * 300 * 3 * 2 = 3600 | | | |
| 32000 | 4 * 300 * 3 * 2 = 7200 | | | |

For processors where division operations take more cycles than others, the state discrimination decision equations can be formulated to avoid division as follows:

If $\zeta_{HS}^{num}(n)<TH_1*\zeta_{HS}^{den}(n)$State=STATE1

Else if $TH_1*\zeta_{HS}^{den}(n)<\zeta_{HS}^{num}(n)<TH_2*\zeta_{HS}^{den}(n)$

State=STATE2 else

State=STATE3 \quad (37)

Irrespective of the sampling rate, the number of basic operations per sample processing remains the same.

b) Discrimination Parameter Estimation for Block Processing

For a block-processing based adaptive filter, two memory buffers ye_buf and yd_buf are used to store the correlations $r_{e\hat{y}}$ and $r_{d\hat{y}}$ estimated every frame. To update these memory buffers another counter indx2 is used, which is similar to the counter indx1 in sample based processing.

The summation of cross-correlations of block of corresponding samples estimated for every frame and their summation for past M−1 frames is used for estimating the final correlations $r_{e\hat{y}}(l)$ and $r_{d\hat{y}}(l)$ respectively.

$$r_{e\hat{y}}(l)=r_{e\hat{y}}(l-1)-ye\_buf(indx2)+\Sigma_{i=1}^{L}\hat{y}(i)e(i) \quad (38)$$

$$r_{d\hat{y}}(l)=r_{d\hat{y}}(l-1)-yd\_buf(indx2)+\Sigma_{i=1}^{L}\hat{y}(i)d(i) \quad (39)$$

The oldest frame's cross-correlation is also removed or replaced with the corresponding current estimate in the appropriate memory buffer.

$$ye\_buf(indx2)=\Sigma_{i=1}^{L}\hat{y}(i)e(i) \quad (40)$$

$$yd\_buf(indx2)=\Sigma_{i=1}^{L}\hat{y}(i)d(i) \quad (41)$$

After updating the buffers, the counter is incremented by one for every frame circularly within M:

indx2=indx2+1 if (indx1>M)

indx2=0 \quad (42)

ye_buf and yd_buf are vectors of length M. The value of M is suitably between 200/L and 300/L for stable operation.

From these correlation estimates, the discrimination parameter $\zeta_{HS}(l)$ for the present frame is calculated similar to the equation (36).

$$\zeta_{HS}^{num}(l) = |r_{e\hat{y}}(l)|$$
$$\zeta_{HS}^{den}(l) = |r_{e\hat{y}}(l) + r_{d\hat{y}}(l)|$$
$$\zeta_{HS}(l) = \frac{\zeta_{HS}^{num}(l)}{\zeta_{HS}^{den}(l)}$$

(43)

Table 2 summarizes the memory required and the operations involved in the implementation of block processing based AEEF.

TABLE 2

Memory required and basic operations involved when K = 300 for frame based processing

| Sampling rate | Memory (Bytes) | Division | Add/Sub/ Mult | Others (Comparison/assignment) |
|---|---|---|---|---|
| 8000 | $\frac{300}{L_{8\,KHz}} * 2 * 4$ | 1 | 2L + 3 + 2L | 2 + 9 |
| 16000 | | | | |
| 32000 | | | | |
| | (32 bit buffers) | | | |

The value of L is varied according to the sampling rate. Hence, the number of basic operations required for a frame of processing also varies with respect to the sampling rate. The memory required is irrespective of the sampling rate, however, as the buffer size M is a ratio and is given by $300/L_{8KHz}$, where, $L_{8KHz}$ is the frame size used for processing an 8 kHz signal. To avoid division operations, state discrimination can be achieved in a similar way to that given by equation (37).

Low-Resource, Moving Average Based Implementation

In order to minimize the memory resource required, instead of using the dot product of the buffers containing past data, correlation estimates $r_{e\hat{y}}$ and $r_{d\hat{y}}$ can be obtained by a moving average technique. A weight of λ is given to the present estimate and (1-λ) to the previous estimate. The moving average value has to be updated every sample and hence the implementation is same for either the sample based or block based processing. It is given by:

$$r_{e\hat{y}}(n) = r_{e\hat{y}}(n-1) + \lambda(\hat{y}(n)*e(n) - r_{e\hat{y}}(n-1))$$ (44)

$$r_{d\hat{y}}(n) = r_{d\hat{y}}(n-1) + \lambda(\hat{y}(n)*d(n) - r_{d\hat{y}}(n-1))$$ (45)

From these correlation estimates the discrimination parameter $\zeta_{HS}$ is calculated in accordance with equation (36).

Table 3 summarizes the memory required and the operations involved in the low resource implementation of discrimination parameter.

TABLE 3

Memory required and basic operations involved in low resource implementation for each sample processed

| Sampling rate | Memory (Bytes) | Division | Add/ Sub/Mult | Others (Comparison/ assignment) |
|---|---|---|---|---|
| 8000 | 2 * 4 | 1 | 3 + 2 + 2 | 2 + 3 |
| 16000 | (32 bit buffers) | | | |
| 32000 | | | | |

Although this implementation requires much less memory than the dot product implementation, the discrimination parameter value is highly dependent on the value of λ, which may sometimes result in the wrong inferences being drawn. The dot product based implementation is highly stable, even though it has slightly higher detection delay.

Practical Results

The discrimination parameter described herein has been found to perform better in practice than existing methods for detecting echo path change.

An example of an existing method is the echo path change detector described in "A Novel Normalised Cross-Correlation Based Echo-Path Change Detector" by Mohammad Asif Iqbal and Steven L. Grant. This paper suggests the following parameter as being sensitive to echo path change but not to near-end speech:

$$\zeta_{asif} = \left| \frac{(h-\hat{h})^T R_{xx} \hat{h}}{\hat{h}^T R_{xx} h} \right|$$ (46)

Although the paper claims that this parameter is normalized, this appears not to be the case. During echo path change or any other period of inaccurate echo estimation, a sign difference between the estimated and the actual impulse response (the $(h-\hat{h})^T$ term in the numerator) can become high. $R_{xx}\hat{h}$ is likely to be a summation of much lower values. This results in the numerator dominating the denominator, and hence a parameter that is not normalised.

The discrimination parameter described herein was tested using speech and CSS test signals. The CSS test signal had near-end speech added from samples 35000 to 52000. An echo path change was incorporated from sample 137632. The speech test signal had near-end speech added from samples 30000 to 50000 and an echo path change incorporated at 73504. Ensemble averages of the test results were analyzed.

Figure 4:
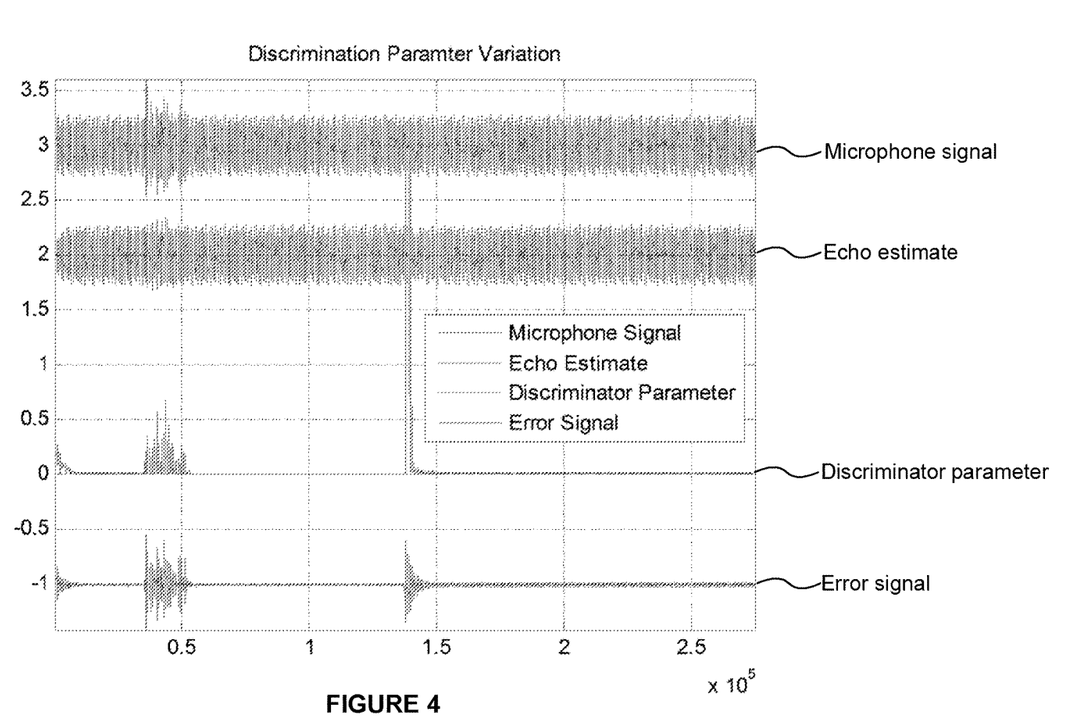
FIG. 4 shows the variation in a discrimination parameter for sample based processing.

FIG. 4 shows the variation of the discrimination parameter $\zeta_{HS}$ for a continuous CSS signal convolved with an ITU-T G.340 impulse response. Echo path change was introduced with the G.167 response.

Figure 5:
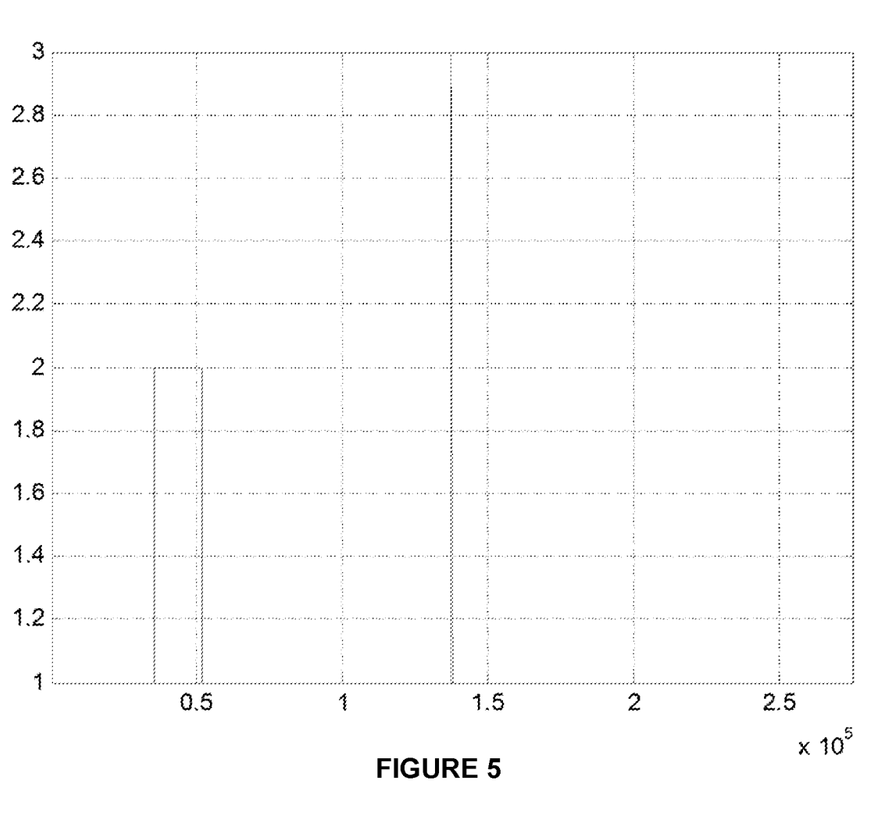
FIG. 5 shows state discrimination for a CSS signal.

FIG. 5 illustrates the state discrimination of the CSS signal. It shows that from samples 35000 to 52000 the microphone signal was judged to be in STATE2; from sample 137632, it moved to STATE3. The remainder of the time the microphone signal was judged to be in STATE1.

Figure 6:
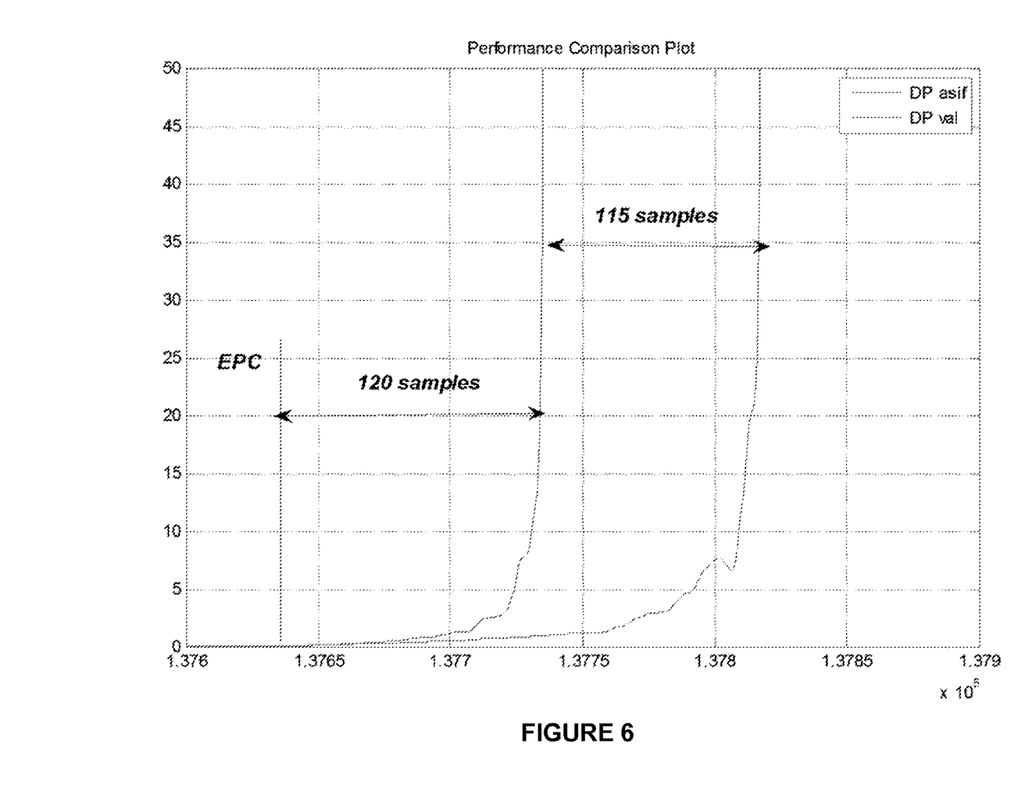
FIG. 6 shows a comparison plot of different discrimination parameters during an echo path change in a CSS signal for a dot product implementation.

FIG. 6 depicts the echo path detection delay comparison between the proposed method and equation (46) for a dot product implementation. It can be observed that the proposed technique takes about 120 samples to detect the echo path change whereas equation (46) takes about 235 samples.

Figure 7:
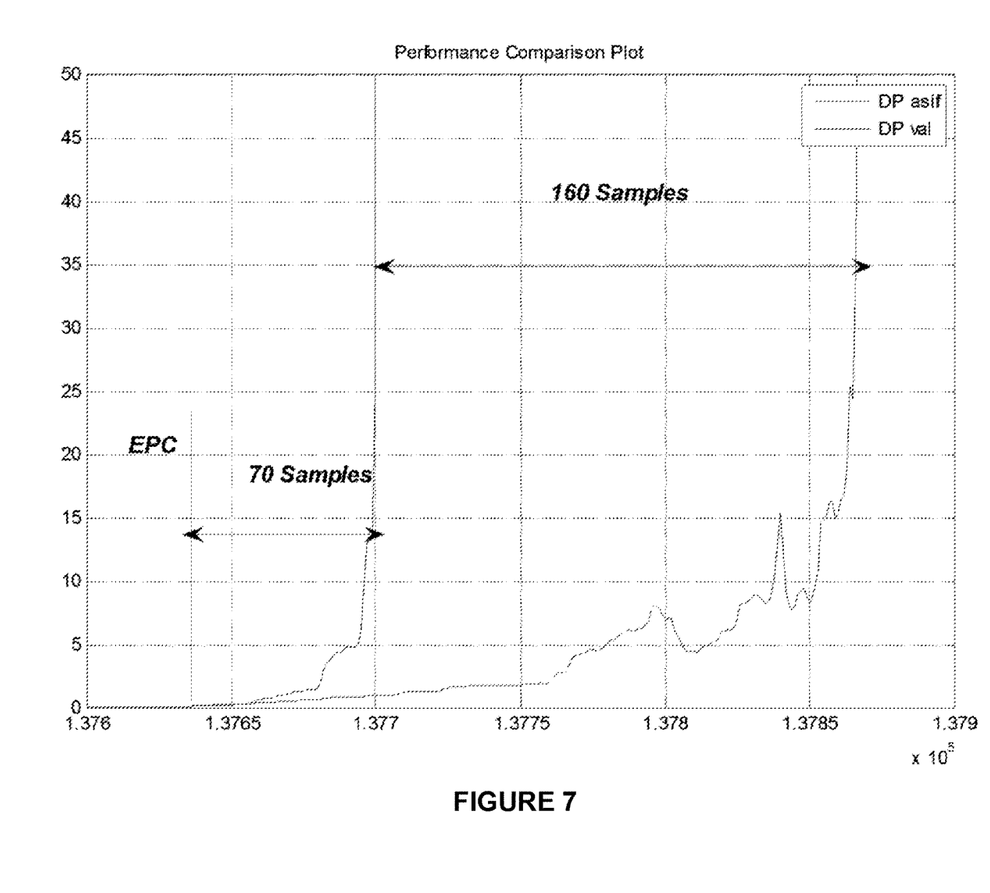
FIG. 7 shows a comparison plot of different discrimination parameters during an echo path change in a CSS signal for a moving average implementation.

FIG. 7 compares the performance of the method described herein with equation (46) for the CSS signal, where correlations are estimated using the moving average technique. The proposed technique takes just 80 samples for echo path detection, whereas equation (46) takes about 230 samples.

Figure 8:
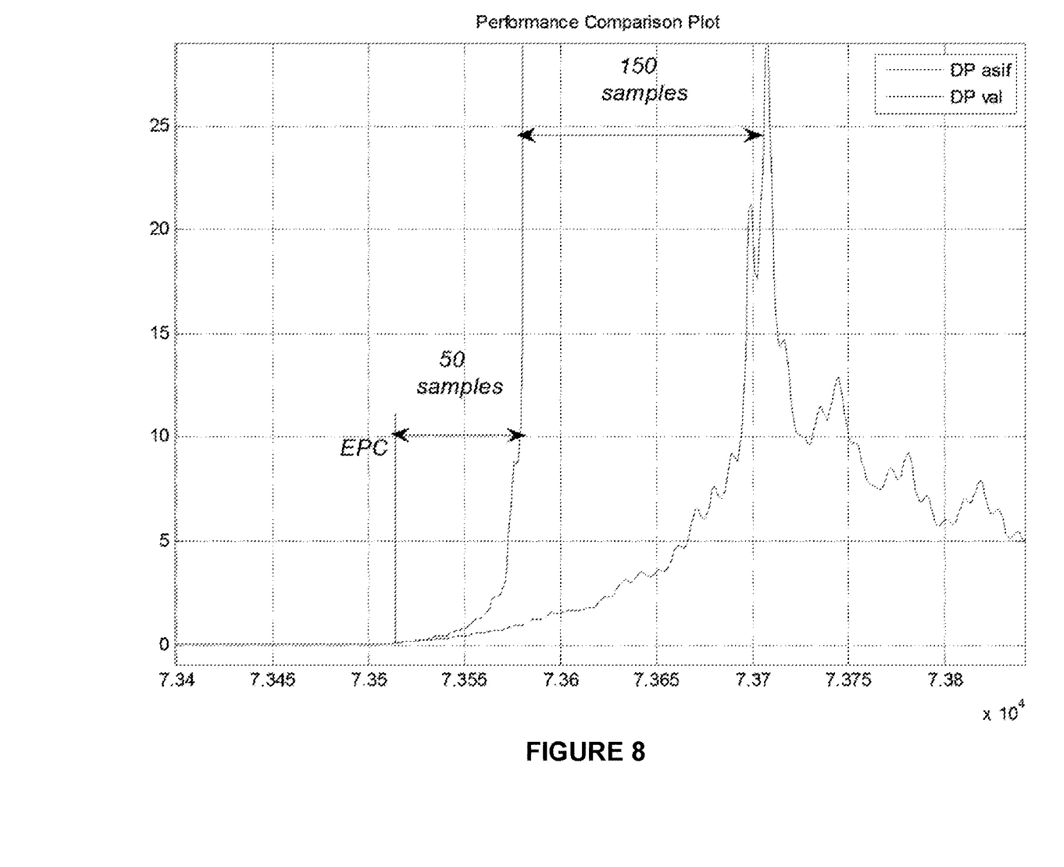
FIG. 8 shows a comparison plot of different discrimination parameters during an echo path change in a speech signal for a dot product implementation.
Figure 9:
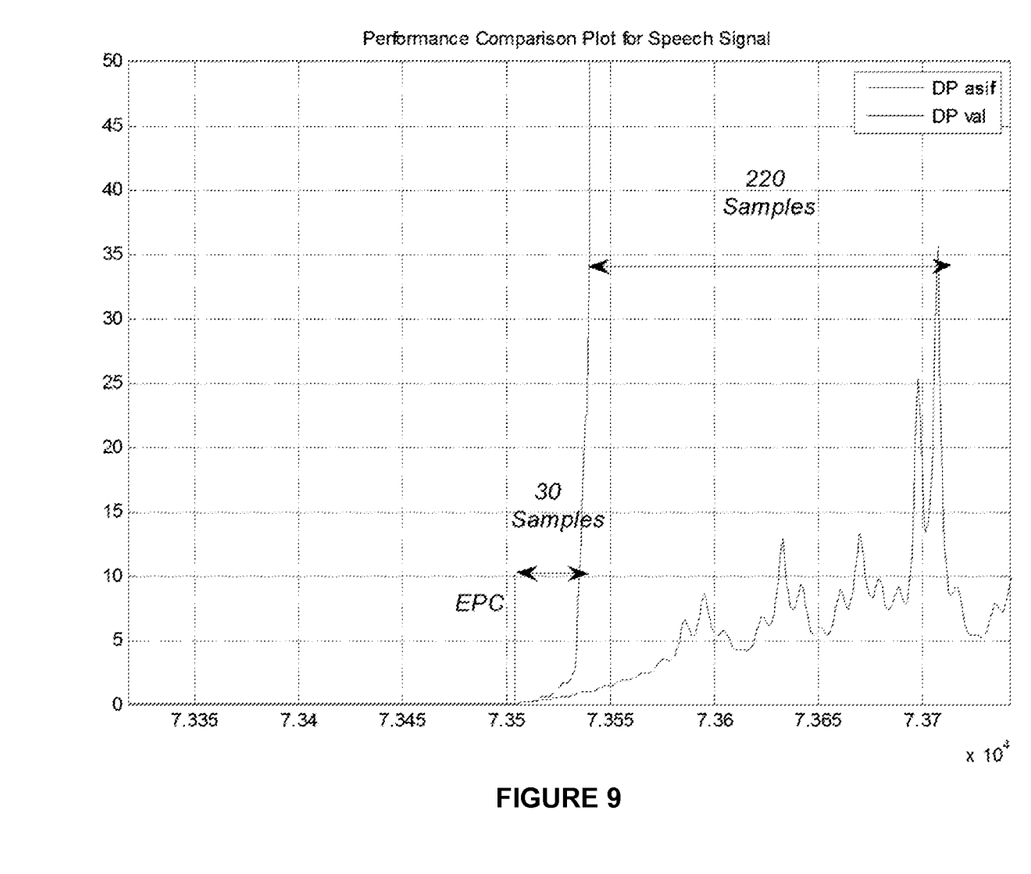
FIG. 9 shows a comparison plot of different discrimination parameters during an echo path change in a speech signal for a moving average implementation.

FIG. 8 and FIG. 9 give the echo path detection comparison between the proposed technique and the method described in equation (46) for a dot product based correlation estimate and for a moving average based correlation estimate respectively for a speech signal. It is observed that the proposed technique performs far better with detection delay occurring within 50 samples compared with 200 to 250 samples for equation (46).

Existing techniques are not quick enough in practice at indicating echo path change, which can result in an audible echo during re-convergence of the adaptive filter. The technique described herein, in contrast, provides very quick detection of echo path change or high mis-adjustment in the filter. The technique can also discriminate between double-talk and single-talk, which enables the adaptive filter to be properly controlled for stable echo cancellation.

The proposed technique is very robust and does not cause spurious detection, even during high near-end speech whereas the inventors have observed spurious echo path change decisions with other techniques during continuous near-end speech.

The discrimination parameter has a high dynamic range, which helps in selection of right threshold for clear discrimination of all possible states of operation of an echo cancellation system. Thus, the proposed technique gives robust and stable operation of the echo cancellation system using state based control. It can work with any adaptive echo cancellation system and can assist or even replace existing control modules.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. An echo path monitoring system for controlling an adaptive filter configured to estimate an echo of a far-end signal comprised in a microphone signal, the system comprising:
   a comparison generator configured to compare the microphone signal with the estimated echo to obtain a first comparison result and compare an error signal, which represents a difference between the microphone signal and the estimated echo, with the estimated echo to obtain a second comparison result; and
   a controller configured to:
      combine the first and second comparison results to form a parameter indicative of a state of the microphone signal;
      control an operating mode of the adaptive filter in dependence on said parameter and on whether the adaptive filter is in a transient state or a steady state, wherein, when the adaptive filter is in the steady state, the controller is configured to assess whether the microphone signal incorporates echo path change.

2. The echo path monitoring system as claimed in claim 1, wherein when the adaptive filter is in a transient state, the controller is configured to not assess whether the microphone signal incorporates echo path change.

3. The echo path monitoring system as claimed in claim 1, the parameter being indicative of one of: (a) near-end speech being present, (b) echo path change in the microphone signal, or (c) near-end speech being present and echo path change in the microphone signal.

4. The echo path monitoring system as claimed in claim 3, the controller being configured to, if the parameter indicates that neither near-end speech nor echo path change is present, control the adaptive filter to operate in a first mode.

5. The echo path monitoring system as claimed in claim 4, the controller being configured to control the adaptive filter to operate in said first mode by continuously adapting its estimation of the echo of the far-end signal.

6. The echo path monitoring system as claimed in claim 3, the controller being configured to, if the parameter indicates that near-end speech is present but echo path change is not present, control the adaptive filter to operate in a second mode.

7. The echo path monitoring system as claimed in claim 6, the controller being configured to control the adaptive filter to operate in the second mode by suspending adaptation of its estimation of the echo of the far-end signal.

8. The echo path monitoring system as claimed in claim 3, the controller being configured to, if the parameter indicates that echo path change is present, control the adaptive filter to act in a third mode.

9. The echo path monitoring system as claimed in claim 8, the controller configured to, when the adaptive filter is operating in the third mode, control a step size of an adaptation performed by the adaptive filter.

10. The echo path monitoring system as claimed in claim 9, the controller being configured to control the adaptive filter to operate in the third mode by re-initialising its adaptation such that the adaptation step size is set to its maximum value.

11. The echo path monitoring system as claimed in claim 1, the controller being configured to assign a state to the microphone signal in dependence an operating state of the adaptive filter.

12. The echo path monitoring system as claimed in claim 11, the controller being configured to assign the state to the microphone signal in dependence on whether the adaptive filter is in a transient state or a steady state.

13. The echo path monitoring system as claimed in claim 12, the controller being configured to, when the adaptive filter is in the steady state, determine that the parameter indicates that neither near-end speech nor echo path change is present if the parameter is below a first predetermined threshold.

14. The echo path monitoring system as claimed in claim 13, the controller being configured to, when the adaptive filter is in the steady state, determine that the parameter indicates that double-talk is present but echo path change is not present if it is between the first predetermined threshold and a second predetermined threshold.

15. The echo path monitoring system as claimed in claim 14, the controller being configured to, when the adaptive filter is in the steady state, determine that the parameter indicates echo path change is present if it is above the second predetermined threshold.

16. The echo path monitoring system as claimed in claim 15, the controller being configured to, when the adaptive filter is in the transient state, compare the parameter with a third predetermined threshold and control the adaptive filter to operate in a first mode if the parameter is below the third threshold and in a second mode if the parameter is above the third predetermined threshold.

17. The echo path monitoring system as claimed in claim 1, the controller being configured to form the parameter by dividing the second comparison result by the sum of the first and second comparison results.

18. The echo path monitoring system as claimed in claim 1, the comparison generator being configured to generate the first comparison result by estimating a cross-correlation of the microphone signal and the estimated echo and to generate the second comparison result by estimating a cross-correlation between the error signal and the estimated echo.

19. A method for controlling an adaptive filter that is configured to estimate an echo of a far-end signal comprised in a microphone signal, the method comprising:
   comparing the microphone signal with the estimated echo to obtain a first comparison result;
   comparing an error signal, which represents a difference between the microphone signal and the estimated echo, with the estimated echo to obtain a second comparison result;
   combining the first and second comparison results to form a parameter indicative of a state of the microphone signal; and
   controlling an operating mode of the adaptive filter in dependence on said parameter and on whether the adaptive filter is in a transient state or a steady state, wherein, when the adaptive filter is in the steady state, assessing whether the microphone signal incorporates echo path change.

20. A non-transitory computer readable storage medium having stored thereon computer readable instructions that, when executed at a computer system, cause the computer system to perform a method for controlling an adaptive filter that is configured to estimate an echo of a far-end signal comprised in a microphone signal, the method comprising:
   comparing the microphone signal with the estimated echo to obtain a first comparison result;
   comparing an error signal, which represents a difference between the microphone signal and the estimated echo, with the estimated echo to obtain a second comparison result;
   combining the first and second comparison results to form a parameter indicative of a state of the microphone signal; and
   controlling an operating mode of the adaptive filter in dependence on said parameter and on whether the adaptive filter is in a transient state or a steady state, wherein, when the adaptive filter is in the steady state, assessing whether the microphone signal incorporates echo path change.

\* \* \* \* \*